UNITED STATES PATENT OFFICE.

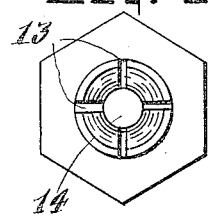
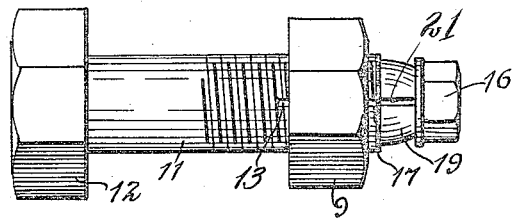
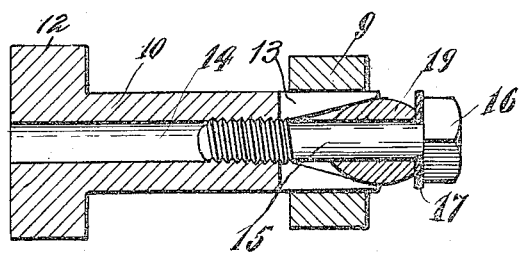

HARRY GERLITZKI AND CHARLES C. EMICK, OF LANCASTER, PENNSYLVANIA.

NUT-LOCK.

1,151,779.  Specification of Letters Patent.  Patented Aug. 31, 1915.

Application filed March 3, 1914. Serial No. 822,113.

*To all whom it may concern:*

Be it known that we, HARRY GERLITZKI and CHARLES C. EMICK, citizens of the United States, residing at Lancaster, in the county of Lancaster and State of Pennsylvania, have invented certain new and useful Improvements in Nut-Locks, of which the following is a specification, reference being had therein to the accompanying drawing.

This invention relates to a nut-lock of that class wherein the locking means are contained partly within the bolt, upon which the nut is to be used. Any nut of proper dimensions may be used.

The object of this invention may be said to reside in the provision of a channeled bolt having slots at the end thereof, whereby that portion of the bolt may be expanded after the nut has been placed thereon to prevent displacement of the nut.

A further object of this invention is the provision of locking means adapted to enter the end of the bolt, and prevent the nut which has been threaded upon the bolt from loosening, and at all times tending to force the same still firmer against the material held together by the bolt.

A still further object of this invention may be said to reside in the fact that the locking means after having acted upon the bolt so as to prevent displacement of the same is prevented from being displaced, should the bolt have a tendency to become loose, thereby securing at all times a tight connection.

A further object of this invention is the provision of a device of this kind, which will be strong and durable, and which will be comparatively simple and inexpensive to manufacture, reliable and efficient in use, and readily operated.

With the above and other objects in view, this invention resides in the novel features of construction, formations, combinations and arrangements of parts to be hereinafter more fully described, claimed and illustrated in the accompanying drawings, in which:—

Figure 1, is a side view of our invention. Fig. 2, is a central longitudinal sectional view of our invention according to Fig. 1. Fig. 3, is a detail view of the spreader showing the slot therein. Fig. 4, is an end view of the bolt and nut, without the locking means in place.

Referring to the accompanying drawings by similar characters of reference, throughout the several views, the numeral 10, designates the bolt which consists of a shank 11, formed at one end with a head 12, and having the diametrically opposite slots 13, preferably four in number, extending for a portion of the length of the threaded portion of said bolt 10; a channel 14, extending the entire length of the bolt 10, and having the end adjacent the slots 13, enlarged to represent an inverted cone, the purpose of which will hereafter be more fully described.

In Fig. 1, we have shown the device used on a short bolt, and the method of operation is as follows:—The nut 9, is placed upon the bolt 10, and the bolt 15, containing the slotted spreader 19, preferably elliptical in shape is threaded in the end of the slotted threaded channel 14, of the bolt 10. It is plainly to be seen that by forcing the spreader 19, within the widened channel portion 14, the slotted portion of the shank 11, of the bolt 10, will spread, preventing the nut 9, from being removed from the shank 11, of the bolt 10, but always having a tendency to force it toward the head 12, of said bolt. Should the bolt 15, become loosened so as to allow the diameter of the expanded portion of the bolt 10, to be reduced, the nut 9, would naturally travel toward the end of the shank, and thereby contract the slotted spreader 19, and pinch the bolt 15, preventing rotation thereof.

It should be understood in this connection that various minor changes in the specific details of construction can be resorted to within the scope of the appended claim without departing from or sacrificing any of the advantages of the invention.

Having thus fully described our invention, what we claim as new, and desire to secure by Letters Patent is:—

In a nut lock of the class described, the combination with a bolt and nut, said bolt formed with a longitudinal channel extending throughout its entire length and bell-shaped adjacent the end of said bolt, the end of said bolt provided with a series of slots, a spreader adapted to enter the bell-shaped end of said channel, and a cap-screw extending through said spreader and threaded into said channel for the purpose of forcing the spreader into the bell-shaped end, and spreading the end of said bolt to prevent the removal of the nut.

In testimony whereof, we affix our signatures in the presence of two witnesses.

HARRY GERLITZKI.
CHARLES C. EMICK.

Witnesses:
JOHN J. THOMPSON,
A. F. SHENCK.

Copies of this patent may be obtained for five cents each, by addressing the "Commissioner of Patents, Washington, D. C."